(12) United States Patent
Koike et al.

(10) Patent No.: US 10,705,771 B2
(45) Date of Patent: Jul. 7, 2020

(54) CONTROL METHOD OF PRINTER AND PRINTER

(71) Applicant: SEIKO EPSON CORPORATION, Tokyo (JP)

(72) Inventors: Toshiaki Koike, Shiojiri (JP); Shunichi Wakasa, Chikuma (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/573,115

(22) Filed: Sep. 17, 2019

(65) Prior Publication Data

US 2020/0089439 A1 Mar. 19, 2020

(30) Foreign Application Priority Data

Sep. 18, 2018 (JP) ................................. 2018-173408

(51) Int. Cl.
*G06F 3/12* (2006.01)
(52) U.S. Cl.
CPC .......... *G06F 3/1204* (2013.01); *G06F 3/1257* (2013.01)
(58) Field of Classification Search
CPC .............................. G06F 3/1204; G06F 3/1257
USPC ....................................................... 358/1.13
See application file for complete search history.

(56) References Cited

U.S. PATENT DOCUMENTS

| 2010/0079804 A1* | 4/2010 | Otsuka | H04L 67/025 |
| | | | 358/1.15 |
| 2010/0225946 A1* | 9/2010 | Fukasawa | G06F 3/1204 |
| | | | 358/1.13 |
| 2016/0142383 A1* | 5/2016 | Asano | H04L 9/14 |
| 2018/0260181 A1* | 9/2018 | Shiohara | G06F 3/1297 |

FOREIGN PATENT DOCUMENTS

JP 2005-309734 A 11/2005

* cited by examiner

*Primary Examiner* — Allen H Nguyen
(74) *Attorney, Agent, or Firm* — Workman Nydegger

(57) ABSTRACT

A printer includes: a storage region which stores a plurality of setting value groups in association with character strings, each of the plurality of setting value groups including one or more setting values for one or more setting items; and a processor. When the processor acquires a first command including one character string and instructing setting of an initial value of a setting item, the processor refers to the storage region to set, as an initial value, the setting value for the one or more setting items included in the setting value group associated with a character string corresponding to the one character string. When the processor acquires a second command instructing execution of a process relating to one setting item of the one or more setting items, the processor executes the process instructed by the second command by using the initial value thus set.

12 Claims, 5 Drawing Sheets

FIG. 2

| CHARACTER STRING | SETTING ITEM | | |
|---|---|---|---|
| | CODE PAGE | FONT | SETTING VALUE GROUP ID |
| Japan | Page 1 | ¥ | 001 |
| America | Page 2 | $ | 002 |
| Europe | Page 3 | € | 003 |

FIG. 3

| CHARACTER STRING | SETTING ITEM | | |
|---|---|---|---|
| | CODE PAGE | FONT | SETTING VALUE GROUP ID |
| Japan | Page 1 | ¥ | 001 |
| America | Page 2 | $ | 002 |
| Europe | Page 3 | € | 003 |
| Korea | Page 4 | W | 004 |

FIG. 5

| CHARACTER STRING | SETTING ITEM | | |
|---|---|---|---|
| | CODE PAGE | FONT | SETTING VALUE GROUP ID |
| Printer 10* | Page 1 | ¥ | 001 |
| Printer 20* | Page 2 | $ | 002 |
| Europe | Page 3 | € | 003 |

CONTROL METHOD OF PRINTER AND PRINTER

The present application is based on, and claims priority from JP Application Serial Number 2018-173408, filed Sep. 18, 2018, the disclosure of which is hereby incorporated by reference herein in its entirety.

BACKGROUND

1. Technical Field

The present disclosure relates to a control method of a printer and the printer.

2. Related Art

JP-A-2005-309734 discloses a technique for transmitting a setting value set command from a host apparatus to a printer. When a user gives a selection operation regarding one or more setting items by using a utility setting screen, the host apparatus transmits, as the setting value set command, a setting value based on a result of the selection made by using the utility setting screen to the printer.

When the technique disclosed in JP-A-2005-309734 is used to perform setting of the printer, a user has to select a setting value regarding each setting item by using the utility setting screen. This requires time and labor to perform setting of the printer, and a selection error of the setting value easily causes a setting error of the printer.

SUMMARY

A control method of a printer of an embodiment of the present disclosure includes: storing one or more setting value groups in association with character strings, the setting value group including one or more setting values corresponding to one or more setting items; acquiring, when a first command including one character string is acquired, the one or more setting values corresponding to the one or more setting items included in the setting value group stored in association with the one character string to set the one or more setting values as one or more initial values; and executing, when a second command is acquired, a process instructed by the second command by using the one or more initial values thus set.

A printer of an embodiment of the present disclosure includes: storage configured to store one or more setting value groups in association with character strings, the setting value group including one or more setting values corresponding to one or more setting items; a processor; and a print head, wherein when the processor acquires a first command including one character string, the processor refers to the storage to acquire the one or more setting values corresponding to the one or more setting items included in the setting value group stored in association with the one character string to set the one or more setting values as one or more initial values, and when the processor acquires a second command, the processor controls the print head to execute a process instructed by the second command by using the one or more initial values thus set.

BRIEF DESCRIPTION OF THE DRAWINGS

FIG. 2 is a view illustrating an example of setting value groups.
FIG. 3 is a view illustrating an example in which a new setting value group is registered in addition to the setting value groups of FIG. 2.
FIG. 5 is a view illustrating an example of setting value groups according to a variation.

DESCRIPTION OF EXEMPLARY EMBODIMENTS

Figure 1:
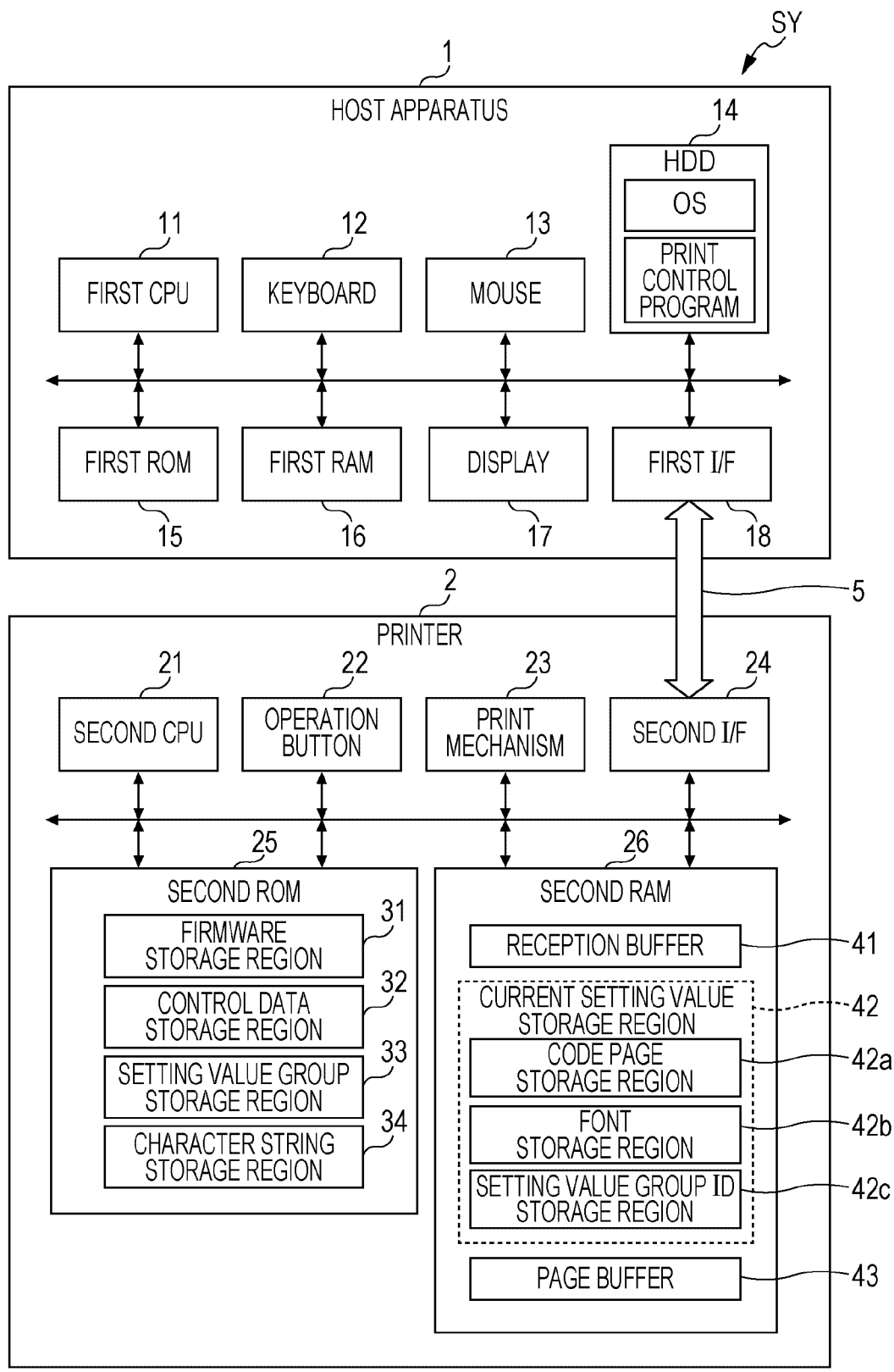
FIG. 1 is a block diagram illustrating a printing system.

A control method of controlling a printer 2 and the printer 2 according to an embodiment will be described below with reference to the drawings. FIG. 1 is a block diagram illustrating a printing system SY. The printing system SY includes a host apparatus 1, the printer 2, and a communication path 5 which connects the host apparatus 1 to the printer 2.

Applications of the host apparatus 1 are not particularly limited. For example, the host apparatus 1 may function as a point of sale (POS) system terminal for checkout processing. The printer 2 may function as a receipt printer configured to print receipts and/or coupons. The communication path 5 may be a leased path such as a cable or a network such as a local area network (LAN) or an Internet-based communication network.

The host apparatus 1 includes a first central processing unit (CPU, processor) 11, a keyboard 12, a mouse 13, a hard disk drive (HDD) 14, memory components such as first read only memory (ROM) 15 and first random access memory (RAM) 16, a display 17, and a communicator (communication substrate, communication circuit, communication connector, communication port) as a first interface 18. Note that in FIG. 1, the first interface 18 is referred to as a "first I/F".

The first CPU 11 is a processor which controls components of the host apparatus 1. The keyboard 12 and the mouse 13 are used for various types of operations to be given by a user. The HDD 14 is an auxiliary storage apparatus and stores an operating system (OS) and a print control program. The OS is basic software read from the HDD 14 and executed by the first CPU 11. The print control program is a program to be read from the HDD 14 and to be executed by the first CPU 11, and the print control program operates on the OS. The print control program functions as a print driver which controls the printer 2.

The first ROM 15 stores various types of control programs such as basic input/output system (BIOS) in a non-volatile manner. The first RAM 16 is used as a reception buffer which performs communication with the printer 2 or a work area in which various types of processes are executed by the first CPU 11. The display 17 displays various types of information such as response data from the printer 2. The first interface 18 is connected via the communication path 5 to a second interface 24 of the printer 2.

On the other hand, the printer 2 includes a second central processing unit (CPU) 21, an operation button 22, a printing mechanism 23, a communicator (communication substrate, communication circuit, communication connector, communication port) which is the second interface 24, and memory components such as second ROM 25 and second RAM 26. Note that in FIG. 1, the second interface 24 is referred to as a "second I/F". The second CPU 21 is an example of a processor.

The second CPU 21 is a processor which controls components of the printer 2. The operation button 22 is used for various types of operations, such as an instruction of test printing, given by a user. The printing mechanism 23 includes a print head, a paper sheet transport mechanism, a paper sheet cutting mechanism, and the like, and under the control by the second CPU 21, the printing mechanism 23 performs printing onto a print medium such as a receipt paper sheet. The second interface 24 is connected via the communication path 5 to the first interface 18 of the host apparatus 1.

The second ROM 25 is a non-volatile storage medium, such as flash ROM, which is writable and which holds data also when a power source is OFF. The second ROM 25 includes a firmware storage region 31, a control data storage region 32, a setting value group storage region 33, and a character string storage region 34 and stores data in a non-volatile manner (non-volatilely). The setting value group storage region 33 and the character string storage region 34 are examples of the storage.

The firmware storage region 31 stores firmware serving as a control program of the printer 2. The second CPU 21 reads the firmware from the firmware storage region 31 and executes the firmware to perform command processing (see FIG. 4) described later. The control data storage region 32 stores pieces of font data or various types of pieces of control data. The pieces of font data correspond to character codes transmitted from the host apparatus 1 and are used to print characters. The character codes are assigned to a code page which is a character code table (a set of character codes) configured by country. The character codes are stored in the control data storage region 32. In the present embodiment, a plurality of code pages corresponding to a plurality of countries, character codes assigned to the code pages, and pieces of font data corresponding to the character codes are associated with one another and are stored in the control data storage region 32 in advance (at the time of shipping from a factory).

The setting value group storage region 33 stores a plurality of setting value groups in association with character strings different from each other in advance (at the time of shipping from a factory). One or more setting value groups of the plurality of setting value groups stored in the setting value group storage region 33 include, for one or more setting items common to the plurality of setting value groups, one or more setting values stored for each setting value group. The setting value group storage region 33 stores a plurality of setting value groups for each destination, such as a country, a region, and a particular customer, of the printer 2.

FIG. 2 is a view illustrating an example of the setting value groups stored in the setting value group storage region 33. Each setting value group in the setting value group storage region 33 shown in FIG. 2 includes, as the setting items, a particular code page, a particular font (letter) (character code, font data), and a setting value group ID (identification information). Note that the code page and the font of these setting items are examples of "an item relating to printing of a character", and the setting value group ID is an example of "identification information different for each of the setting value groups". Note that for the setting item corresponding to the code page, information specifying any code page by country among a plurality of code pages stored in the control data storage region 32 is stored as a setting value. Moreover, for the setting item corresponding to the font, a particular character code or font data, that is, a character code or font data registered as an external character stored in the control data storage region 32 by an external character registration command is stored as a setting value. Furthermore, for the setting item corresponding to the setting value group ID, identification information for identifying a setting value group, that is, information denoting the destination of the printer 2 is stored as a setting value.

The setting value group in the setting value group storage region 33 shown in FIG. 2 includes, as one or more setting values for one or more setting items, "Page 1" for the code page, "¥" (Japanese yen symbol) for the font, and "001" for the setting value group ID are stored in association with "Japan" as the character string. That is, "Page 1" is information specifying the code page for Japan, "¥" is the font data or the character code registered as an external character specified for Japan, and "001" is information denoting Japan as the destination. Moreover, as the other setting value groups in the setting value group storage region 33 shown in FIG. 2, a setting value group for the U.S.A. and a setting value group for Europe for one or more setting items common to the setting value group for Japan are stored respectively in association with "America" as the character string and "Europe" as the character string stored in the character string storage region 34.

A first command received from the host apparatus 1 includes any character string stored in the character string storage region 34. The first command is a command including an arbitrary character string (a character string) such as "Japan", "America", or "Europe" denoting the destination of the printer 2 and is a command instructing setting of an initial value of the setting item. That is, the first command is a command instructing setting of one or more initial values for one or more setting items according to the destination of the printer 2.

The second RAM 26 is a volatile storage medium used as work memory by the second CPU during controlling and includes a reception buffer 41, a current setting value storage region 42, and a page buffer 43. The reception buffer 41 transiently (volatilely) stores an instruction command received from the host apparatus 1.

When the power source is ON, the current setting value storage region 42 may copy some of the setting values based on a character string as a provisional destination of the plurality of setting value groups stored in the setting value group storage region 33, and the current setting value storage region 42 may transiently store, as provisional setting values used by the second CPU for control, the some of the setting values as one or more setting values included in a currently set setting value group. The second CPU may use these provisional setting values until the second CPU receives the first command from the host apparatus 1. The current setting value storage region 42 includes a code page storage region 42a, a font storage region 42b, and a setting value group ID storage region 42c. Thus, the current setting value storage region 42 stores a setting value of each setting item in a corresponding one of the storage regions divided for the setting items.

When the second CPU receives the first command from the host apparatus 1, the second CPU refers, based on a character string included in the first command, a character string stored in the character string storage region 34 and copies and stores one or more setting values stored in association with the character string and included in the setting value group storage region 33 as one or more initial values in the current setting value storage region 42 to use the one or more setting values. Note that when the second CPU next receives a fourth command instructing a change of a setting value from the host apparatus 1, the initial value is changed to (overwritten with) a setting values for an arbitrary setting item (a setting item) included in the fourth command, and hereafter, the second CPU performs control by using the setting value thus changed. These setting values stored in the current setting value storage region 42 are held and used by the second CPU for the control until the power source is turned off and contents in the second RAM 26 are erased.

The page buffer 43 is a region in which data expansion for outputting print data to the printing mechanism 23 is performed. In the second ROM 25, font data corresponding to a character code assigned to each code page is stored. When the command received from the host apparatus 1 is a command instructing printing of a character, the second CPU 21 refers to the setting values stored in the current setting value storage region 42, and based on a currently set code page, the second CPU 21 reads font data corresponding to the character code included in the command from the second ROM 25, expands (stores) the font data in the page buffer 43 provided in the second RAM 26 to generate print data, outputs the print data to the printing mechanism 23, and drives the print head to perform printing. Note that a line buffer may be used in place of the page buffer 43.

According to the above-described configuration, when the second CPU 21 receives, from the host apparatus 1, the first command including an arbitrary character string and instructing setting of initial values for the setting items, the second CPU 21 refers to the setting value group storage region 33 in which a setting value group (setting items and setting values) is stored in association with the arbitrary character string in advance to set, as one or more initial values to be used by the second CPU 21, one or more setting values for one or more setting items included in the setting value group associated with the arbitrary character string in the current setting value storage region 42. For example, when the second CPU 21 receives a first command containing "Japan" as the character string, the second CPU 21 reads one or more setting values for one or more setting items which are stored in the setting value group storage region 33 and which are associated with "Japan" as the character string so as to set the one or more setting values as one or more initial values in the current setting value storage region 42. Here, "set as one or more initial values" means that the one or more setting values for the one or more setting items included in the setting value group associated with "Japan" as the character string are stored in respective storage regions in the current setting value storage region 42.

Moreover, when the second CPU 21 receives, from the host apparatus 1, a second command instructing execution of a process relating to an arbitrary setting item (a setting item) of the one or more setting items included in the setting value group, the second CPU 21 uses the one or more initial value set in the current setting value storage region 42 to execute the process instructed by the second command. When the second CPU 21 receives, as the second command, for example, a command including a character code and instructing printing of a character, the second CPU 21 uses the code page and the font set in the current setting value storage region 42 to control the printing mechanism 23 to print the character corresponding to the character code thus received.

Alternatively, when the second CPU 21 receives, for example, as the second command, a command instructing outputting of the setting value group ID, the second CPU 21 refers to the current setting value storage region 42 and reads the setting value group ID currently set in the setting value group ID storage region 42c so as to transmit the setting value group ID. Specifically, when the second CPU 21 receives, as the second command, an inquiry request command of the setting value group ID, the second CPU 21 transmits response data containing the setting value group ID set in the current setting value storage region 42 to the host apparatus 1. The host apparatus 1 displays the setting value group ID contained in the response data in the display 17 so as to notify a user of the setting value group ID. Alternatively, when the second CPU 21 receives, as the second command, a test print instruction command, the second CPU 21 causes the printing mechanism 23 to print test printing data containing the setting value group ID set in the current setting value storage region 42, thereby performing test printing including the setting value and notifies a user of the test printing. Note that the test printing is also executable by an operation given to the operation button 22. That is, when an operation given to the operation button 22 is detected, the second CPU 21 starts test printing and causes the printing mechanism 23 to print test printing data containing the setting value group ID set in the current setting value storage region 42.

Moreover, when the second CPU 21 receives, from the host apparatus 1, a third command which includes a setting value group and a character string corresponding to the setting value group and which instructs registration of the setting value group, the second CPU 21 associates the setting value group included in the third command with the character string included in the third command and newly registers the setting value group in the setting value group storage region 33. For example, when the information shown in FIG. 2 is stored in the setting value group storage region 33, and the second CPU 21 receives a third command including the character string corresponding to "Korea", the code page "Page 4", the font "symbol representing Won of the currency of Korea", and the setting value group ID "004", the second CPU 21 additionally registers a new setting value group in the setting value group storage region 33 as illustrated in FIG. 3. The second ROM 25 is a non-volatile storage medium, and the setting value group thus added holds data also when the power source is OFF.

Moreover, when the second CPU 21 receives, from the host apparatus 1, a fourth command including a setting value corresponding to an arbitrary setting item and instructing changing of a setting value, the second CPU 21 changes the initial value set to the setting item to the setting value for the arbitrary setting item included in the fourth command. That is, when the second CPU 21 receives the fourth command, the second CPU 21 stores in (overwrites) a corresponding storage region in the current setting value storage region 42 (with) the setting value for the arbitrary setting item included in the fourth command to change the initial value.

For example, when "Page 1" is stored in the code page storage region 42a, and the second CPU 21 receives a fourth command including "code page" as the setting item and "Page 2" as the setting value, the second CPU 21 stores "Page 2" in the code page storage region 42a to perform changing from "Page 1". In this case, setting values set in the font storage region 42b and the setting value group ID storage region 42c for the other items in the current setting value storage region 42 are not changed. Moreover, when the font storage region 42b stores "¥", and the second CPU 21 receives a fourth command including "font" as the setting item and "$" as the setting value, the second CPU 21 stores "$" in the font storage region 42b to perform changing from "¥". In this case, setting values set in the code page storage region 42a and the setting value group ID storage region 42c for the other items in the current setting value storage region 42 are not changed.

Note that based on the fourth command, the setting value set in the current setting value storage region 42 of the second RAM 26 is erased along with interruption of power to the printer 2. Thus, when the printer 2 is reactivated, one or more setting values provisionally set and included in a setting value group associated with one character string stored in the character string storage region 34 are set (copied) in the current setting value storage region 42.

Note that command systems of the first command, the second command, the third command, and the fourth command are not particularly limited to this embodiment but may be, for example, ESC/POS (registered trademark). Moreover, the commands are described by different character strings for respective types of the commands, and for example, the first command is described as "ESC 1", the second command is described as "ESC 2", the third command is described as "ESC 3", and the fourth command is described as "ESC 4". The second CPU 21 determines the types of the commands based on a prescribed number of character strings at a top part of the command thus received. Moreover, information included in the command is added to the back of the character string denoting the type of the command. For example, when an initial value for Japan is to be set, the host apparatus 1 transmits a first command "ESC 1 Japan" to the printer 2, and when an initial value for the U.S.A. is to be set, a first command "ESC 1 America" is transmitted to the printer 2.

Note that the second command may include different types of commands in accordance with the difference of processes of which the execution is to be instructed. For example, a command instructing printing of a character may be "ESC 21", and a command instructing outputting of the setting value group ID may be "ESC 22". In this case, the second command is a collection of commands instructing execution of processes relating to an arbitrary setting item of the one or more setting items such as these "ESC 21" and "ESC 22" stored in the setting value group storage region 33. Alternatively, the second command may refer to either the command instructing printing of a character or the command instructing outputting of the setting value group ID.

Figure 4:
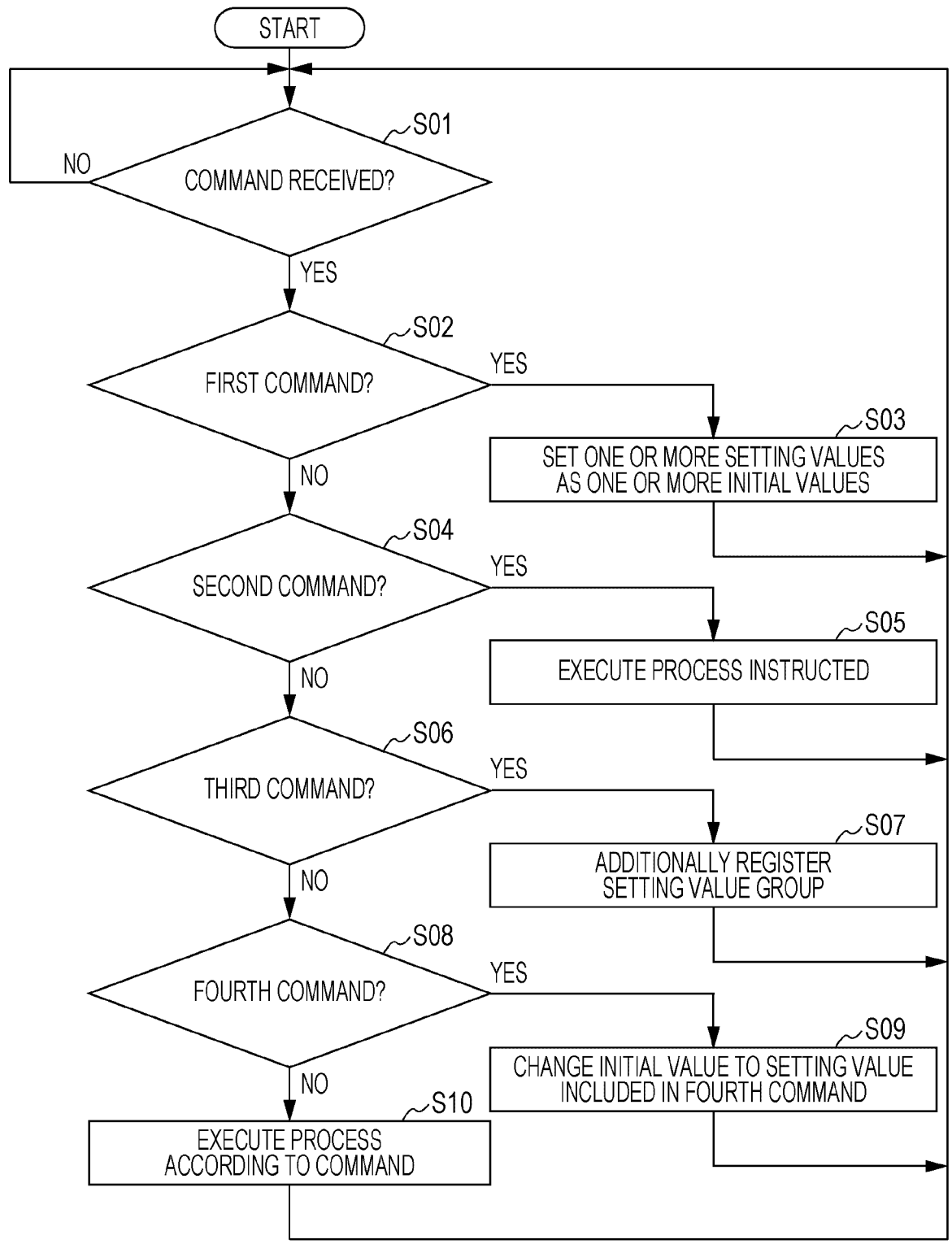
FIG. 4 is a flowchart illustrating a flow of command processing by a printer.

FIG. 4 is a flowchart illustrating a flow of command processing by the printer 2. The second CPU 21 determines whether or not a command from the host apparatus 1 is received (S01). That is, the second CPU 21 determines whether or not the command is stored in the reception buffer 41. If the second CPU 21 determines that the command from the host apparatus 1 is not received (S01: No), the process returns to step S01. If the second CPU 21 determines that the command from the host apparatus 1 is received (S01: Yes), the second CPU 21 determines whether or not the command thus received is the first command (S02).

If the second CPU 21 determines that the command thus received is the first command (S02: Yes), the second CPU 21 refers to the setting value group storage region 33 and the character string storage region 34 to set one or more setting values for one or more setting items included in a setting value group associated with an arbitrary character string included in the first command as one or more initial values in the current setting value storage region 42 (S03), and the process returns to step S01. In contrast, if the second CPU 21 determines that the command thus received is not the first command (S02: No), the second CPU 21 determines whether or not the command thus received is the second command (S04).

If the second CPU 21 determines that the command thus received is the second command (S04: Yes), the second CPU 21 uses the one or more setting values set in the current setting value storage region 42 to execute a process instructed by the second command (S05), and the process returns to step S01. In contrast, if the second CPU 21 determines that the command thus received is not the second command (S04: No), the second CPU 21 determines whether or not the command thus received is the third command (S06).

If the second CPU 21 determines that the command thus received is the third command (S06: Yes), the second CPU 21 associates a setting value group included in the third command with a character string included in the third command and additionally registers the setting value group in the setting value group storage region 33 and the character string storage region 34 (S07), and the process returns to step S01. In contrast, if the second CPU 21 determines that the command thus received is not the third command (S06: No), the second CPU 21 determines whether or not the command thus received is the fourth command (S08).

If the second CPU 21 determines that the command thus received is the fourth command (S08: Yes), the second CPU 21 changes the initial value stored in the current setting value storage region 42 to a setting value for an arbitrary setting item included in the fourth command and uses the setting value (S09), and the process returns to step S01. In contrast, if the second CPU 21 determines that the command thus received is not the fourth command (S08: No), the second CPU 21 executes a process according to the command thus received (S10), and the process returns to step S01.

As described above, the printer 2 includes the setting value storage region 33. The setting value storage region 33 stores a plurality of setting value groups in association with character strings different from each other. The plurality of setting value groups each include one or more setting values for one or more setting items. Therefore, simply receiving the first command including an arbitrary character string enables one or more initial values for one or more setting items included in the setting value group associated with the arbitrary character string to be set collectively within a short time. Moreover, a user no longer has to set setting items individually, which thus enables setting errors of the printer 2 to be reduced.

Moreover, since the setting value group includes the one or more setting values for the one or more setting items common to the plurality of setting value groups, it is possible to set, depending on a scene, an initial value based on a desired setting value group of the plurality of setting value groups in which different setting values are set for common setting items. Moreover, since the setting value groups are set for respective destinations of the printer 2, transmission of the first command enables one or more setting items depending on the destinations to be set collectively within a short time. Moreover, it is possible to configure the first command by using a character string easily perceivable by a user, which enables setting errors to be reduced.

Moreover, the printer 2 receives the second command, and thereby, it is possible to print a character corresponding to the destination of the printer 2 or to output the setting value group ID corresponding to the destination of the printer 2. Moreover, the printer 2 receives the third command, and thereby, it is possible to additionally register a setting value group without changing the firmware of the printer 2. Moreover, the printer 2 receives the fourth command, and thereby, it is possible to flexibly change the setting value depending on usage.

The above-described embodiment is not construed as limiting, and the following variations are adoptable.

First Variation

In the embodiment, when the first command is received, the one or more setting values for the one or more setting items included in the setting value group associated with an arbitrary character string included in the first command are set as the one or more initial values. However, the initial value may be settable even when the character string included in the first command does not exactly match a character string stored in the setting value group storage region 33.

FIG. 5 is a view illustrating an example of setting value groups according to a variation. Character strings, such as "Printer 10*" and "Printer 20*", part of which are wildcards are associated with the setting value groups of the variation. In this case, for example, when the character string included in the first command is "Printer 101", "Printer 102" or the like, one or more setting values associated with the character string "Printer 10*" are set as one or more initial values. That is, when the second CPU 21 receives a first command including an arbitrary character string and instructing setting of one or more initial values for one or more setting items, the second CPU 21 sets one or more setting values for the one or setting items included in the setting value group associated with the character string corresponding to the arbitrary character string as the one or more initial values. As the character string included in the first command, an equipment model ID specifying the model of the printer 2 may be used, for example.

Note that in this case, the character string included in the first command is "Printer 101". Therefore, "Printer 101" is stored in the character string storage region 34. Thus, when the printer 2 is reactivated, the second CPU 21 sets, in the setting value group storage region 33, one or more setting values for one or more setting items included in a setting value group associated with a character string corresponding to the character string stored in the character string storage region 34 as one or more initial values.

Moreover, in response to an inquiry from the host apparatus 1 about a model ID, the second CPU 21 may transmit a character string stored in the character string storage region 34. Moreover, when a material containing a model ID is to be printed as test printing, the second CPU 21 may print a material containing a character string stored in the character string storage region 34 in accordance with an instruction from the host apparatus 1 or an operation given to the operation button 22.

Second Variation

In the embodiment, "Japan", "America", and the like are described as examples of the character string included in the first command. However, as the character string included in the first command, a setting value group ID may be adopted. In this case, the setting value group storage region 33 may store the setting value group ID as the character string and delete the setting value group ID from the setting item. Alternatively, storing of the character string may be omitted from the setting value group storage region 33. In this case, when the second CPU 21 receives the first command from the host apparatus 1, the second CPU 21 determines a setting value group including a character string corresponding to an arbitrary character string included in the first command as a setting value group for setting one or more initial values, and the second CPU 21 sets one or more setting values for one or more setting items included in the setting value group thus determined as the one or more initial values.

Third Variation

In the embodiment, the setting value groups include, for the one or more setting items common to the plurality of setting value groups, the one or more setting values stored for each of the setting value groups, but the setting value groups may contain setting values for setting items different for the respective setting value groups. For example, the second CPU 21 may store a first setting value group and a second setting value group in the setting value group storage region 33. The first setting value group contains a code page and a setting value group ID as the setting items. The second setting value group contains a font and a setting value group ID as the setting items. In this case, for the setting items not included in the setting value group, default setting values predetermined separately may be set as the initial values.

Fourth Variation

In the embodiment, the setting value group storage region 33 which stores the plurality of setting value groups is provided in the printer 2 but is not necessarily present in the printer 2. The setting value group storage region 33 may be present in storage to which the second CPU 21 can refer.

Fifth Variation

As the setting items to be included in a setting value group, items other than the code page, the font, and the setting value group ID may be included. For example, the setting items relating to a character decoration, a typeface, a command response character string, a print format, paper setting, a paper sheet cutting system, an operation mode, and the like may be included.

Moreover, the second command may instruct processes other than printing of characters and outputting of the setting value group ID.

Sixth Variation

In the embodiment, receiving the third command enables the setting value group to be additionally registered but may enable the setting value group to be deleted. In this case, when the printer 2 receives a fifth command which includes a character string corresponding to any setting value group of the plurality of setting value groups stored in the setting value group storage region 33 and which instructs deletion of the setting value group, the printer 2 deletes, from the setting value group storage region 33, the setting value group associated with the character string corresponding to the character string included in the fifth command.

Other Variations

A method of executing processes of the printer 2 described in each of the embodiment and the variations, a program for executing each process of the printer 2, and a computer readable recording medium storing the program also fall within the scope of the disclosure. Moreover, the configurations of the embodiment and the variations may be combined with each other. Moreover, when various types of electronic devices in place of the printer 2 are set, each of the embodiment and the variations may be applied. Alternatively, modifications, such as cooperation of hardware and software to realize each process of the printer 2, may be made accordingly without departing from the scope of the disclosure.

A control method of controlling the printer 2 is a control method of controlling the printer 2 storing a plurality of setting value groups including one or more setting values for one or more setting items in association with character strings different from each other, the control method including: setting, when a first command which includes one character string and which instructs setting of an initial value of a setting item is received, the one or more setting values for the one or more setting items included in the setting value group associated with a character string corresponding to the one character string as one or more initial values; and executing, when a second command instructing execution of a process relating to one setting item of the one or more setting items is received, the process instructed by the second command by using the one or more initial values thus set.

The printer 2 includes: the storage 33 which stores a plurality of setting value groups in association with character strings different from each other, each of the plurality of setting value groups including one or more setting values for one or more setting items; and a processor 21 configured to refer to the storage 33, wherein when the processor 21 receives a first command including one character string and instructing setting of one or more initial values of a setting item, the processor 21 refers to the storage 33 to set the one or more setting values for the one or more setting items included in the setting value group associated with a character string corresponding to the one character string as the one or more initial values, and when the processor 21 receives a second command instructing execution of a process relating to one setting item of the one or more setting items, the processor 21 executes the process instructed by the second command by using the one or more initial values thus set.

This configuration enables the printer 2 to refer to the storage 33. The setting value storage region 33 stores the plurality of setting value groups in association with the character strings different from each other. The plurality of setting value groups each include the one or more setting values for the one or more setting items. Therefore, simply receiving the first command including one character string enables the one or more initial values for the one or more setting items included in the setting value group associated with a character string corresponding to the one character string to be set collectively within a short time. Moreover, the printer 2 receives the second command, which enables the printer 2 to execute a process instructed by the second command by using the one or more initial values thus collectively set. Furthermore, a user no longer has to set individual setting items, which enables setting errors of the printer 2 to be reduced.

In the control method of controlling the printer 2, the one character string is a character string representing a destination of the printer, and the setting value group may include the one or more setting values stored for the one or more setting items common to the setting value groups.

This configuration enables the printer 2 to accordingly use the setting value group including the one or more setting values stored for the one or more common setting items in accordance with the destination of the printer 2.

In the control method of controlling the printer 2, the one or more setting items may include an item relating to printing of a character and items representing identification information different for each of the setting value groups, and the second command may be a command instructing at least one of the printing of the character and outputting the pieces of identification information of the setting value groups set as the initial values.

With this configuration, the printer 2 receives the second command, which enables the printer 2 to perform at least one of the printing of the character and the outputting the pieces of identification information of the setting value groups set as the initial values.

The control method of controlling the printer 2 may include associating, when a third command which includes a setting value group and a character string corresponding to the setting value group and which instructs additional registration of the setting value group is received, the setting value group included in the third command with the character string included in the third command and storing the setting value group.

With this configuration, the printer 2 receives the third command, which enables the printer 2 to additionally register the setting value group without changing the firmware of the printer 2.

The control method of controlling the printer 2 may include changing, when a fourth command which includes a setting value and which instructs changing of the setting value for one setting item is received, the initial values thus set to the setting value for the one setting item included in the fourth command.

With this configuration, the printer 2 receives the fourth command, which enables the printer 2 to flexibly change the setting value depending on usage.

What is claimed is:

1. A control method of a printer, the control method comprising:
    storing one or more setting value groups in association with character strings, the setting value group including one or more setting values corresponding to one or more setting items;
    acquiring, when a first command including one character string is acquired, the one or more setting values corresponding to the one or more setting items included in the setting value group stored in association with the one character string to set the one or more setting values as one or more initial values; and
    executing, when a second command is acquired, a process instructed by the second command by using the one or more initial values thus set.

2. The control method according to claim 1, wherein
    the one character string is a character string representing a destination of the printer, and
    the setting value group includes the one or more setting values for the one or more setting items common to the setting value groups.

3. The control method according to claim 2, wherein
    the one or more setting items include an item relating to printing of a character and an item representing identification information different for the setting value groups, and
    the second command is a command instructing at least one of the printing of the character and transmitting of the identification information set as the initial value of the setting value group.

4. The control method according to claim 1, wherein
    when a third command which includes the setting value group and the character string corresponding to the setting value group is acquired, the setting value group included in the third command is newly stored in association with the character string included in the third command.

5. The control method according to claim 1, wherein when a fourth command including one setting item and the setting value corresponding to the one setting item is acquired, the initial value set in accordance with the one setting item included in the fourth command is changed to the setting value included in the fourth command.

6. The control method according to claim 1, wherein the setting value group including the one or more setting values corresponding to the one or more setting items is non-volatilely stored in association with the character string, and the one or more initial values are volatilely stored.

7. A printer comprising:
storage configured to store one or more setting value groups in association with character strings, the setting value group including one or more setting values corresponding to one or more setting items;
a processor; and
a print head, wherein
when the processor acquires a first command including one character string, the processor refers to the storage to acquire the one or more setting values corresponding to the one or more setting items included in the setting value group stored in association with the one character string to set the one or more setting values as one or more initial values, and
when the processor acquires a second command, the processor controls the print head to execute a process instructed by the second command by using the one or more initial values thus set.

8. The printer according to claim 7, wherein
the one character string is a character string representing a destination of the printer, and
the setting value group includes the one or more setting values for the one or more setting items common to the setting value groups.

9. The printer according to claim 8, wherein
the one or more setting items include an item relating to printing of a character and an item representing identification information different for the setting value groups, and
the second command is a command instructing at least one of the printing of the character and transmitting of the identification information set as the initial value of the setting value group.

10. The printer according to claim 7, wherein
when a third command which includes the setting value group and the character string corresponding to the setting value group is acquired, the storage newly stores the setting value group included in the third command in association with the character string included in the third command.

11. The printer according to claim 7, wherein
when a fourth command including one setting item and the setting value corresponding to the one setting item is acquired, the storage changes the initial value stored in accordance with the one setting item included in the fourth command to the setting value included in the fourth command.

12. The printer according to claim 7, comprising volatile memory which stores the initial values, wherein the storage is non-volatile memory.

* * * * *